United States Patent
Koertzen et al.

(10) Patent No.: US 7,821,246 B2
(45) Date of Patent: Oct. 26, 2010

(54) VOLTAGE REGULATOR AND METHOD OF CALIBRATING THE SAME

(75) Inventors: Henry W. Koertzen, Olympia, WA (US); Joseph T. Dibene, II, Olympia, WA (US); Dave Gordon, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 11/966,264

(22) Filed: Dec. 28, 2007

(65) Prior Publication Data

US 2009/0167282 A1 Jul. 2, 2009

(51) Int. Cl.
*G05F 1/46* (2006.01)
*G01D 18/00* (2006.01)

(52) U.S. Cl. .......... 323/349; 323/283; 702/85; 713/310; 713/340

(58) Field of Classification Search .......... 323/283, 323/299, 349, 351; 702/64, 60, 85; 713/300, 713/310, 340
See application file for complete search history.

(56) References Cited

U.S. PATENT DOCUMENTS

| | | | |
|---|---|---|---|
| 6,452,804 B1 | 9/2002 | Dibene, II et al. | |
| 6,694,272 B1 * | 2/2004 | Zvonar | 702/64 |
| 6,772,356 B1 * | 8/2004 | Qureshi et al. | 713/321 |
| 6,801,431 B2 | 10/2004 | Hartke et al. | |
| 6,845,013 B2 | 1/2005 | Hartke et al. | |
| 6,847,529 B2 | 1/2005 | Dibene, II et al. | |
| 6,879,489 B2 | 4/2005 | Koertzen | |
| 6,919,715 B2 * | 7/2005 | Muratov et al. | 323/285 |
| 6,952,783 B2 | 10/2005 | Koertzen et al. | |
| 7,017,063 B2 * | 3/2006 | Morse et al. | 713/340 |
| 7,167,379 B2 | 1/2007 | DiBene, II et al. | |
| 7,245,507 B2 | 7/2007 | DiBene, II et al. | |
| 7,366,928 B2 * | 4/2008 | Park | 713/310 |
| 7,366,929 B1 * | 4/2008 | Mimberg | 713/310 |

* cited by examiner

*Primary Examiner*—Gary L Laxton
(74) *Attorney, Agent, or Firm*—KED & Associates, LLP

(57) ABSTRACT

A voltage regulator is provided that includes a power cell to provide a calibrated output voltage based on a voltage identification (VID) offset, and a master controller to provide a VID code to the power cell. The power cell to calibrate the output voltage based on the VID code received from the master controller and based on the VID offset.

20 Claims, 4 Drawing Sheets

VOLTAGE REGULATOR AND METHOD OF CALIBRATING THE SAME

BACKGROUND

1. Field

Embodiments of the present invention may relate to calibrating an output voltage of a voltage regulator.

2. Background

Integrated circuits may require a supply voltage in a particular range. The accuracy of the supply voltages may need to be high. Therefore, precise regulation and monitoring of the supply voltage may be required.

BRIEF DESCRIPTION OF THE DRAWINGS

Embodiments may be described in detail with reference to the following drawings in which like reference numerals refer to like elements and wherein.

DETAILED DESCRIPTION

Embodiments of the present invention may provide a method of calibrating an output voltage of at least one power cell of an Integrated Silicon Voltage Regulator (ISVR) or a voltage regulator. The method may include providing a Voltage Identification (VID) code to the power cell of the ISVR. The VID code may specify a desired output voltage of the power cell. The method may also include determining a VID offset of the power cell. The VID offset may be determined based on a comparison with an output voltage of the power cell or by using a lookup table. The VID offset may be determined from the lookup table based on the VID code, a temperature of the power cell and/or an output current of the power cell. The method may further include providing an output voltage based on the determined VID offset and the VID code, thereby calibrating the output voltage of the power cell (and the ISVR).

For ease of discussion, the following discussion may relate to an integrated silicon voltage regulator. However, embodiments of the present invention may be applicable to other types of voltage regulators.

Figure 1:
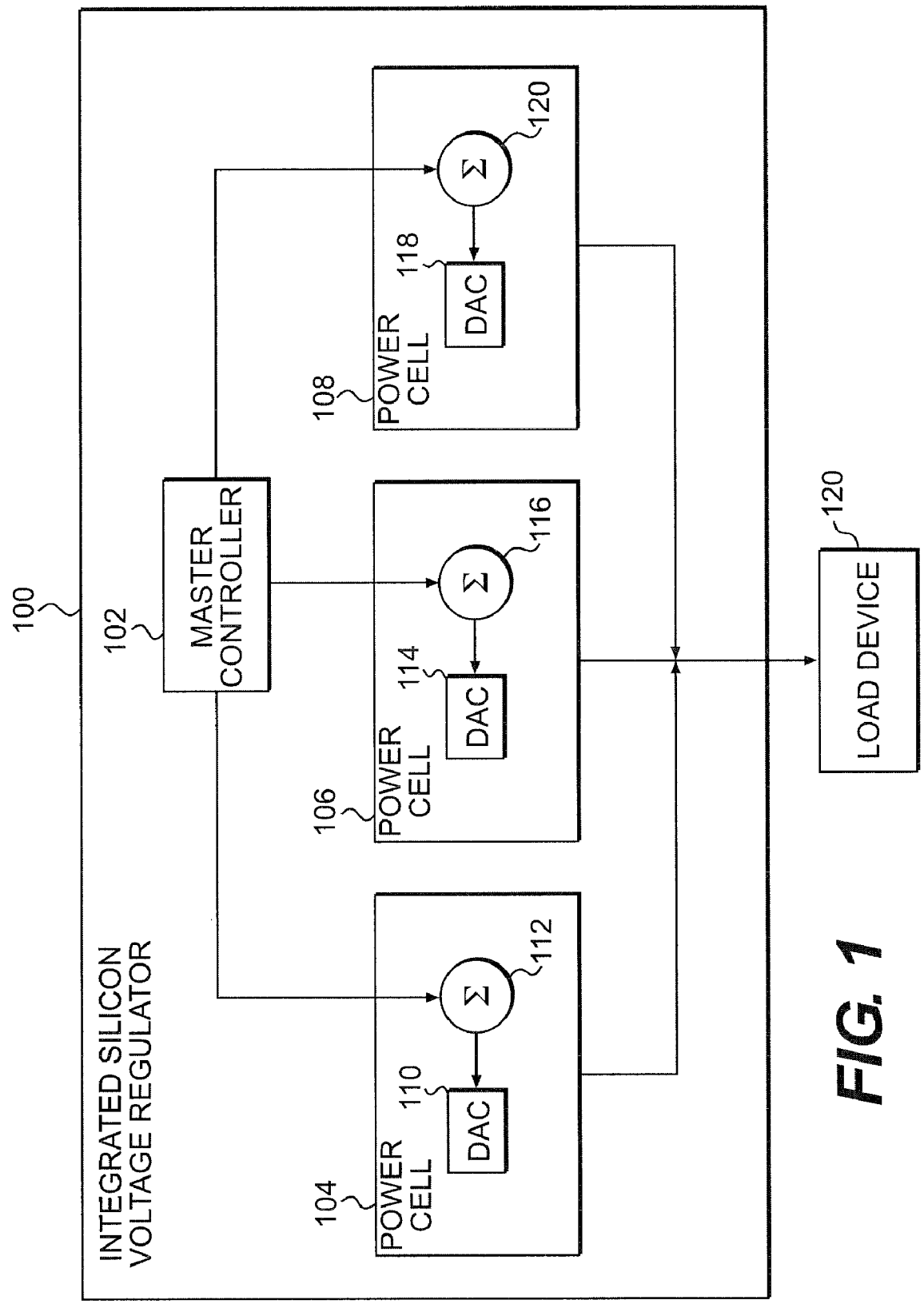
FIG. 1 is a block diagram illustrating an Integrated Silicon Voltage Regulator (ISVR) according to an example embodiment of the present invention.

FIG. 1 is a block diagram illustrating an Integrated Silicon Voltage Regulator according to an example embodiment of the present invention. Other embodiments and configurations are also within the scope of the present invention. More specifically, FIG. 1 shows an ISVR 100 that operates as a voltage regulator and regulates source voltages.

The ISVR 100 may be coupled to a plurality of devices, such as a cache memory, to regulate the supply voltage to each of the devices. As one example, the cache memory may require a supply voltage (or source voltage) within a predetermined voltage range. Since the predetermined voltage range is small, high accuracy may be needed. Further, the source voltage for read and write operations of the cache memory may be small and within a small range. Regulation and monitoring of the source voltage of the plurality of devices may be performed by the ISVR 100. For ease of illustration, FIG. 1 only shows one device, namely load device 120.

The ISVR 100 may include a master controller 102 and a plurality of power cells 104, 106, 108. The following discussion relates to the master controller 102. However, embodiments of the present invention are also applicable to other types of controllers. While FIG. 1 only shows the power cells 104, 106 and 108, other numbers of power cells in the ISVR 100 may also be provided. Each of the power cells 104, 106 and 108 may include a power converter (e.g. a Digital to Analog Converter (DAC) and a Buck converter), a controller (not shown in FIG. 1) and a register (not shown in FIG. 1). FIG. 1 also shows the load device 120 such as a cache memory to receive a supply voltage from the ISVR 100 (such as from the power cell 104).

The power cell 104 may include a DAC 110 and an adding device 112, the power cell 106 may include a DAC 114 and an adding device 116 and the power cell 108 may include a DAC 118 and an adding device 120. Each of the power cells 104, 106, 108 may operate as a separate voltage regulator and may be capable of regulating the source voltage to the load device 120 (or a plurality of devices). Each of the power cells 104, 106 and 108 may operate by separately comparing a corresponding output voltage (of the power cell) to a desired output voltage (of the power cell). The desired output voltage may be specified in a Voltage Identification Code (VID) that is received from the master controller 102. The desired output voltage may be stored in a register of the corresponding power cell. The VID code for each of the power cells 104, 106 and 108 may be unique to the power cell and may specify the desired output voltage of the particular power cell.

A power control unit on a processor may provide a plurality of specific VID codes to the master controller 102. Each VID code may be specific to one of the power cells. The master controller 102 may send the VID code to each of the power cells 104, 106, 108 or to only the specific power cell. The power cell specific to the VID code may store the VID code in a register. The VID code may specify the desired output voltage of the power cell.

Each of the power cells 104, 106 and 108 may compare an output voltage of the corresponding power cell to the desired output voltage for the corresponding power cell (based on the VID code). For example, in the power cell 104, a controller (not shown) may compare the output voltage of the power cell 104 with the desired output voltage (specified in the VID code received from the master controller 102). Based on the comparison, a VID offset may be determined. The VID offset may be equal to a difference between the output voltage of the power cell and the desired output voltage specified in the VID code of the power cell. The VID offset may use to adjust the VID code received from the master controller 102. In other words, the VID offset may be used to calibrate the output voltage of the power cell 104. The power cell 104 may provide a calibrated output voltage based on the determined VID offset.

The determined VID offset may be combined with the desired output voltage (specified in the VID code received by the power cell 104 from the master controller 102) at the adding device 112. The adding device 112 provides a digital summation prior to being provided to the DAC 110. Stated differently, the adding device 112 may provide a calibrated digital output voltage (or a calibrated digital output voltage reference) based on the desired output voltage (from the VID code) and the determined VID offset. The DAC 110 may convert the digital output voltage reference into an analog output voltage, thereby generating or providing the calibrated output voltage.

Similar calculations and calibrations may be performed in each of the power cells 106 and 108. That is, the power cell 106 may determine an analog output voltage (or calibrated output voltage) based on a VID code received from the master controller 102 and a determined VID offset. The power cell 108 may determine an analog output voltage (or calibrated output voltage) based on a VID code received from the master controller 102 and a determined VID offset.

An output of one or more power cells 104, 106, 108 may be coupled to the load device 120 (or to a plurality of load devices). Accordingly, the ISVR 100 may regulate the supply voltage to the device 120. Calibration of each of the power cells 104, 106 and 108 may be performed at a die level before each of the cells is internally connected in the ISVR 100. Additionally, since each of the power cells 104, 106, 108 may not be internally shorted together at the die level, each of the power cells 104, 106, 108 may be calibrated simultaneously (or substantially simultaneously), thereby reducing the time required for calibrating the ISVR 100. The reduction in time required for calibrating the ISVR 100 may speed up operations performed by the devices connected to the ISVR 100.

Calibration of each of the power cells of the ISVR 100 may be done after each of power cells is connected internally to the ISVR 100. Each of the power cells may be calibrated sequentially and the remaining power cells may be disabled. For example, the power cell 104 may be initially calibrated and the power cells 106 and 108 may be disabled. Thereafter, the power cell 106 may be calibrated and the power cells 104 and 108 may be disabled. Finally, the power cell 108 may be calibrated and the power cells 104 and 106 may be disabled.

Figure 2:
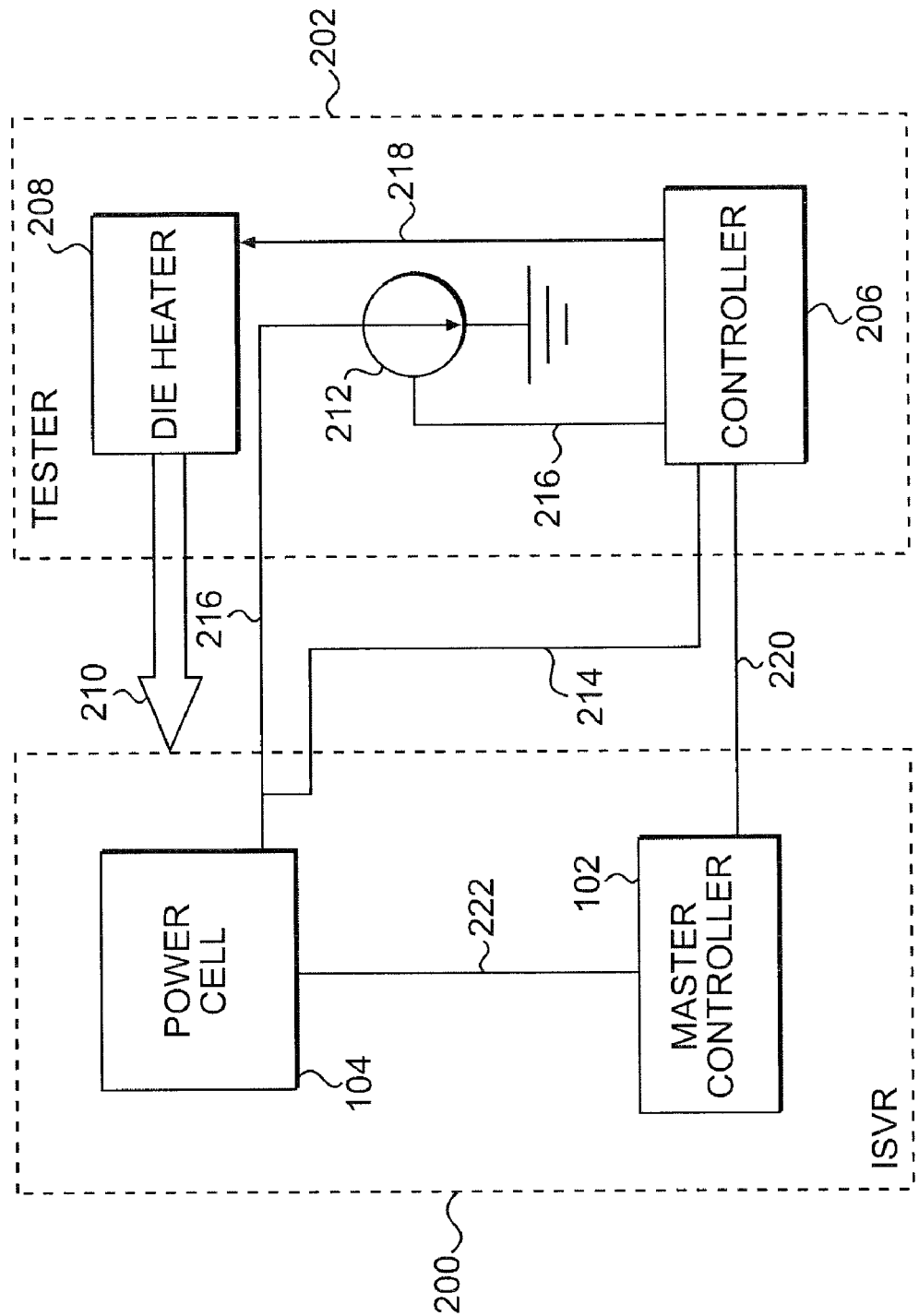
FIG. 2 is a block diagram illustrating an ISVR connected to a tester according to an example embodiment of the present invention.

FIG. 2 is a block diagram illustrating an ISVR connected to a tester according to an example embodiment of the present invention. Other embodiments and configurations are also within the scope of the present invention. More specifically, FIG. 2 shows an ISVR 200 (or ISVR die) and a tester 202. The ISVR 200 may correspond to the ISVR 100 shown in FIG. 1. More specifically, the ISVR 200 may include the master controller 102 and a plurality of power cells. For ease of illustration, FIG. 2 only shows the power cell 104. The master controller 102 may be coupled to the power cell 104 through an internal data bus 222.

The tester 202 may include a die heater 208 coupled to a controller 206 by a link 218. The controller 206 may be coupled to the master controller 102 through a data bus 220. The controller 206 may send the plurality of VID codes to the master controller 102 through the data bus 220. A sense element 212 may sense an output current of the power cell 104.

An implementation of an Active Voltage Positioning (AVP) or a load line may require reduction in an output voltage with an increase in an output current level of the power cell 104. The output voltage of the power cell 104 may vary according to Equation (1) described below:

$$v_o = VID - (LL \cdot i_o) \quad (1)$$

The output voltage $v_o$ of the power cell 104 may be equal to the voltage specified in the VID code received by the power cell 104 from the master controller 102 minus a product of resistance LL and an output current level $i_o$ of the power cell 104. The output voltage may vary according to Equation (1). The sense element 212 may be used to measure the output current of the power cell 104. However, there may be variations in a current sensed by the sense element 212 because of the manufacturing tolerance and temperature variations. Therefore, the output current level of the power cell 104 may compensate for the variations. Further, the sense element 212 may have a tolerance and the tolerance of the power cell 104 may also be compensated. The output voltage and the output current of the power cell 104 may be fed to the controller 206 through links 216 and 214, respectively.

The controller 206 may send a temperature of the power cell 104 to the die heater 208 through the link 218. The die heater 208 may be coupled to the ISVR 200 through a link 210. The output voltage and the output current of the power cell 104 may be calibrated as may be described with respect to FIG. 3.

Figure 3:
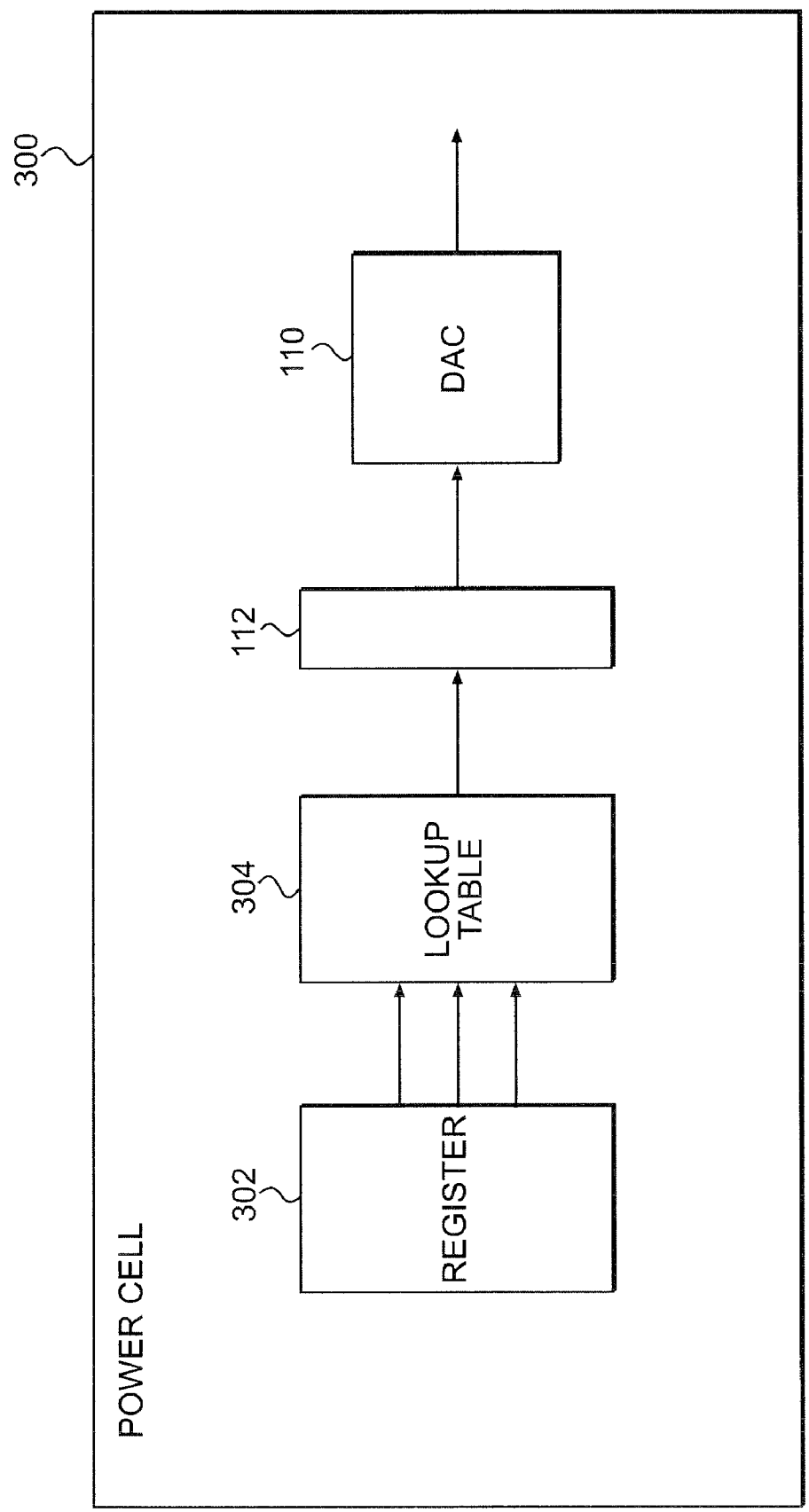
FIG. 3 is a block diagram of a power cell of an ISVR according to an example embodiment of the present invention.

FIG. 3 is a block diagram of a power cell according to an example embodiment of the present invention. Other embodiments and configurations are also within the scope of the present invention. More specifically, FIG. 3 shows a power cell 300 that may correspond to one of the power cells 104, 106 and 108 of FIG. 1. The power cell 300 may include a register 302, a look up table (LUT) 304, the adding device 112 and the DAC 110. The register 302 may store a VID code of the power cell 300 (such as from the master controller 102), an uncalibrated temperature of the power cell 300, and an uncalibrated output current of the power cell 300. The VID code may specify the desired output voltage of the power cell 300. The register 302 may store the VID code, the temperature and the output current of the power cell.

The lookup table 304 may be provided in a memory of the cell or may be provided in the register 302. The lookup table 304 may receive the VID code, the temperature and the output current from the register 302 and may provide the VID offset. The lookup table 304 may also be implemented in hardware that includes an n-bit lookup table with a multiplexer whose select lines are inputs of the lookup table. The n-bit lookup table may encode any n-input Boolean function by modeling the boolean function as truth tables.

As discussed above, the inputs to the lookup table 304 may include the VID code received from the master controller 102, the uncalibrated temperature of the power cell 300 and the uncalibrated output current of the power cell 300. The lookup table 304 may store a plurality of offsets values ($V_{offset}$). The plurality of offsets values may be precompiled and stored in the lookup table 304 based on a plurality of resistance values, temperatures and output currents of a power cell. Based on the inputs, the lookup table 304 may provide or determine a specific VID offset. Since the lookup table 304 may be used for generating the VID offset of the power cell 300, the efficiency of the system may increase as generation of the VID offset takes less time when the VID offset is generated by mapping the VID code, the temperature and the output current of the power cell in the lookup table as compared to computing the VID offset based on predefined equations. Accordingly, the lookup table 304 may receive the VID code, the temperature and the output current from the register 302 and provide the VID offset.

When the lookup table 304 is implemented in software, then a unique lookup table may be generated for each of the plurality of power cells of the ISVR 100 or 200. The unique lookup table may be generated each time during sort and test operation of the tester 202. The VID offset may be provided by the lookup table 304. The adding device 112 may provide a calibrated digital voltage (or updated voltage) by combining the VID code (such as from the master controller 102) and the VID offset (output from the LUT 304). Stated differently, the adding device 112 may provide an updated voltage based on the VID offset provided by the lookup table and the VID code.

The DAC 110 may convert the calibrated digital voltage (or updated voltage) into an analog output voltage, thereby calibrating the output voltage. Stated differently, a converter may convert the updated voltage from the adding device 112 into the calibrated output voltage.

Further, Active Voltage Positioning (AVP) or a Load Line may be implemented in each of the plurality of power cells of the ISVR 100 or 200. The AVP may require reduction in output voltage of the power cell 300 when output current of the power cell increases.

Figure 4:
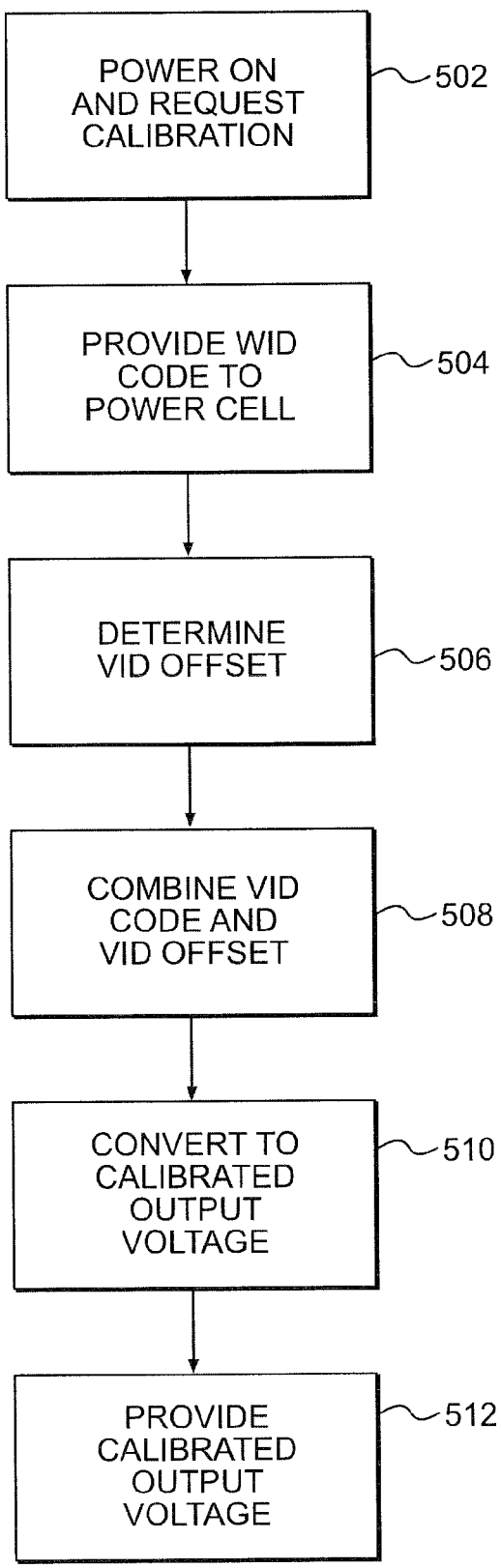
FIG. 4 is a flow diagram illustrating a method of calibrating an output voltage of a power cell of an ISVR according to an example embodiment of the present invention.

FIG. 4 is a flow diagram illustrating a method of calibrating an output voltage of a power cell of an ISVR according to an example embodiment of the present invention. Other operations, orders of operation and embodiments are also within the scope of the present invention.

In operation 502, the ISVR 100 or 200 may power on and a request for calibrating a source voltage may be made. At operation 504, a VID code may be provided to a power cell by the master controller 102. The VID code may specify a desired output voltage of the power cell.

A VID offset may be determined in operation 506. As one example, the VID offset may be determined based on a comparison of an output voltage of the cell and a desired output voltage. As another example, the VID offset may be determined based on the VID code, an uncalibrated temperature and an output current of the power cell. As stated above with respect to FIG. 3, the VID offset may be determined based on the VID code, the uncalibrated temperature and the uncalibrated current.

In operation 508, the VID offset may be combined with the VID code and an updated output voltage may be provided. Thereafter, in operation 510, the DAC of the power cell may convert the updated output voltage into an analog output voltage (or a calibrated output voltage). In operation 512, the calibrated output voltage may be provided to a specific device as a supply voltage.

The operations shown in FIG. 4 may be performed for each of the power cells such that each power cell provides a separate calibrated output voltage. The master controller 102 may provide a plurality of VID codes each being specific to one of the plurality of power cells.

Embodiments of the present invention may use a digital capability of an ISVR for cost effectively calibrating an output voltage of each of the plurality of power cells. Embodiments of the present invention may combine calibration of an output voltage along with AVP implementation. The plurality of power cells may be calibrated simultaneously, thereby reducing the time required for calibrating the ISVR.

An external tester may be used in a sort and test process to generate an offset voltage (i.e., a single value or a lookup table). External equipment may be needed due to the accuracy required. The generated offset voltage or lookup table may then be stored in the master controller (or in the power cell).

A power cell may then use the offset value or lookup table to calibrate the output voltage of the power cell. This may only be a static calibration (i.e., only done once) or it may be a dynamic calibration (i.e., as a function of the VID, the temperature and current).

Embodiments of the present invention may provide a method of calibrating an output voltage of an Integrated Silicon Voltage Regulator (ISVR). The method may include providing a Voltage Identification (VID) code to a power cell of the ISVR, determining a VID offset for the power cell, and providing an output voltage of the power cell based on the determined VID offset. The method may also include providing a VID code to another power cell of the ISVR, determining a VID offset for the another power cell, and providing an output voltage of the another power cell based on the determined VID offset.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of calibrating an output voltage comprising:
providing a Voltage Identification (VID) code to a power cell of a voltage regulator;
determining a VID offset for the power cell based on the VID code received at the power cell; and
providing a calibrated output voltage from a converter of the power cell by combining the VID code with the determined VID offset to obtain a calibrated digital voltage, providing the calibrated digital voltage to the converter, converting the calibrated digital voltage to the calibrated output voltage, and outputting the calibrated output voltage from the converter of the power cell.

2. The method of claim 1, wherein the VID code to specify a desired output voltage of the power cell.

3. The method of claim 2, wherein providing the output voltage includes combining the determined VID offset with the desired output voltage of the power cell.

4. The method of claim 2, wherein determining the VID offset includes determining a difference between an output voltage of the power cell and the desired output voltage specified in the VID code of the power cell.

5. The method of claim 1, wherein determining the VID offset includes determining the VID offset based on the VID code received at the power cell, a temperature of the power cell and an output current of the power cell.

6. The method of claim 5, wherein determining the VID offset further includes outputting the determined VID offset for the power cell from a lookup table based on the VID code, the temperature of the power cell and the output current of the power cell.

7. The method of claim 1, further comprising:
providing a Voltage Identification (VID) code to another power cell of the voltage regulator;
determining a VID offset for the another power cell based on the VID code received at the another power cell; and
providing a calibrated output voltage from a converter of the another power cell based on the determined VID offset for the another power cell.

8. A voltage regulator comprising:
a power cell to provide a calibrated output voltage from a converter based on a voltage identification (VID) offset; and a controller to provide a VID code to the power cell, the power cell to calibrate the output voltage from the converter based on the VID code received at the power cell from the controller and based on the VID offset, the power cell including a look up table to provide the VID offset based on at least the VID code received at the power cell, an adding device to provide a calibrated digital voltage by combining the VID code and the VID offset, and a converter to convert the calibrated digital voltage into the calibrated output voltage.

9. The voltage regulator of claim 8, wherein the VID code to specify a desired output voltage of the power cell.

10. The voltage regulator of claim 8, wherein the power cell includes a register to store the VID code received at the power cell, a temperature and an output current of the power cell.

11. The voltage regulator of claim 8, wherein the lookup table to provide the VID offset based on the VID code, a temperature and an output current of the power cell.

12. The voltage regulator of claim 11, wherein the adding device to provide an updated voltage based on the VID offset provided by the lookup table and the VID code received at the power cell.

13. The voltage regulator of claim 12, wherein the converter to convert the updated voltage from the adding device into the calibrated output voltage.

14. The voltage regulator of claim 8, further comprising a plurality of power cells each to provide a separate calibrated output voltage.

15. The voltage regulator of claim 14, wherein the controller to provide a plurality of specific VID codes each being specific to one of the plurality of power cells.

16. The voltage regulator of claim 15, wherein each of the power cells are provided on a single die.

17. The voltage regulator of claim 8, wherein the converter is a digital-to-analog converter.

18. The method of claim 7, wherein each of the power cells are provided on a single die.

19. The method of claim 7, wherein providing the calibrated output voltage from the converter of the another power cell includes:
combining the VID code with the VID offset to obtain a calibrated digital voltage,
providing the calibrated digital voltage to the converter of the another converter,
converting the calibrated digital voltage to the calibrated output voltage, and
outputting the calibrated output voltage from the converter of the another power cell.

20. The method of claim 1, wherein the converter is a digital-to-analog converter.

* * * * *